(12) United States Patent
Weiss et al.

(10) Patent No.: US 11,829,786 B2
(45) Date of Patent: *Nov. 28, 2023

(54) COLLABORATION HUB FOR A GROUP-BASED COMMUNICATION SYSTEM

(71) Applicant: Slack Technologies, LLC, San Francisco, CA (US)

(72) Inventors: Noah Weiss, Austin, TX (US); John Rodgers, Vancouver (CA); Pedro Carmo, San Francisco, CA (US); Michael Hahn, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,729

(22) Filed: Sep. 21, 2022

(65) Prior Publication Data
US 2023/0018239 A1 Jan. 19, 2023

Related U.S. Application Data

(63) Continuation of application No. 17/321,136, filed on May 14, 2021, now Pat. No. 11,481,236.

(51) Int. Cl.
| | |
|---|---|
| *G06F 9/451* | (2018.01) |
| *G06F 9/52* | (2006.01) |
| *G06F 3/0484* | (2022.01) |
| *G06F 3/0482* | (2013.01) |
| *G06F 9/54* | (2006.01) |

(52) U.S. Cl.
CPC ............ *G06F 9/451* (2018.02); *G06F 3/0482* (2013.01); *G06F 3/0484* (2013.01); *G06F 9/52* (2013.01); *G06F 9/547* (2013.01)

(58) Field of Classification Search
CPC ...... G06F 3/0482; G06F 3/0484; G06F 9/451; G06F 9/52; G06F 9/547
See application file for complete search history.

(56) References Cited

U.S. PATENT DOCUMENTS

| | | | | |
|---|---|---|---|---|
| 6,831,308 | B2 * | 12/2004 | Ono ..................... | H01L 31/1035 257/190 |
| 7,124,164 | B1 * | 10/2006 | Chemtob ............ | H04L 12/1822 709/204 |

(Continued)

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013) 2 pages.

(Continued)

*Primary Examiner* — Eric J. Bycer
(74) *Attorney, Agent, or Firm* — Erise IP, P.A.

(57) ABSTRACT

Computer-readable media, methods, and systems for generating a collaboration hub for display within a graphical user interface of a group-based communication system. The collaboration hub comprises a list of recommended active users, a list of recommended active synchronous multimedia collaboration sessions, and a feed of recommended asynchronous collaboration threads such that relevant activity within the group-based communication system is viewable and accessible to users of the group-based communication system.

20 Claims, 8 Drawing Sheets

(56) References Cited

U.S. PATENT DOCUMENTS

| | | | |
|---|---|---|---|
| 9,232,065 B1* | 1/2016 | Gargi | H04L 67/53 |
| 9,940,394 B1* | 4/2018 | Grant | G06F 16/951 |
| 10,560,662 B1* | 2/2020 | Tippana | H04L 65/1069 |
| 10,848,445 B1* | 11/2020 | Willmann | H04L 51/046 |
| 2008/0276184 A1* | 11/2008 | Buffet | G06Q 10/10 |
| | | | 715/752 |
| 2013/0014023 A1* | 1/2013 | Lee | G06Q 10/101 |
| | | | 715/751 |
| 2013/0024782 A1* | 1/2013 | Lynn | H04M 1/2746 |
| | | | 715/752 |
| 2014/0108562 A1* | 4/2014 | Panzer | G06Q 10/10 |
| | | | 709/204 |
| 2014/0218461 A1* | 8/2014 | DeLand | H04L 51/52 |
| | | | 704/9 |
| 2014/0375747 A1* | 12/2014 | Martinez | H04L 65/1104 |
| | | | 348/14.02 |
| 2015/0149929 A1* | 5/2015 | Shepherd | H04L 12/1822 |
| | | | 715/753 |
| 2015/0317123 A1* | 11/2015 | Wu | H04M 3/568 |
| | | | 715/727 |
| 2015/0319113 A1* | 11/2015 | Gunderson | H04L 65/1083 |
| | | | 715/753 |
| 2016/0021179 A1* | 1/2016 | James | H04N 21/252 |
| | | | 709/204 |
| 2016/0028784 A1* | 1/2016 | Gupta | H04L 12/1831 |
| | | | 709/205 |
| 2016/0099987 A1* | 4/2016 | Shamma | H04N 21/4147 |
| | | | 709/206 |
| 2016/0323398 A1* | 11/2016 | Guo | H04L 67/535 |
| 2017/0142170 A1* | 5/2017 | Sylvain | H04L 65/4038 |
| 2018/0205797 A1* | 7/2018 | Faulkner | H04L 67/14 |
| 2018/0212903 A1* | 7/2018 | Rose | H04L 12/1822 |
| 2018/0287982 A1 | 10/2018 | Draeger et al. | |
| 2018/0295079 A1* | 10/2018 | Longo | H04L 51/10 |
| 2018/0367484 A1* | 12/2018 | Rodriguez | H04L 67/75 |
| 2019/0026298 A1* | 1/2019 | Jin | H04L 12/1859 |
| 2019/0058680 A1* | 2/2019 | Rosania | H04L 51/216 |
| 2019/0098087 A1* | 3/2019 | Johnston | G06F 16/13 |
| 2019/0302233 A1* | 10/2019 | Nishita | G01S 17/08 |
| 2019/0342519 A1* | 11/2019 | Van Os | G06F 9/542 |
| 2019/0373415 A1* | 12/2019 | Fairbanks | H04W 4/029 |
| 2020/0374146 A1* | 11/2020 | Chhabra | H04L 12/1822 |

OTHER PUBLICATIONS

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/pemnalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014) 8 pages.

Ernie Smith, "Picking up the Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014), 2 pages.

Michael Carney, "Slack is thriving on a cocktail of whimsy and great timing", Pandodaily, Lexisnexis, https://advance.lexis.com/api/pemnalink/dd2d4ee5-2ddf-4d3a-a1d9-3bcee5e38b74/?context=1000516, (dated Feb. 6, 2015, 2:12 AM) 3 pages.

Mike Issac, "Slack, a Start-up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

COLLABORATION HUB FOR A GROUP-BASED COMMUNICATION SYSTEM

RELATED APPLICATIONS

This application is a continuation application claiming priority benefit, with regard to all common subject matter, of U.S. Non-Provisional patent application Ser. No. 17/321,136, filed May 14, 2021, and entitled "COLLABORATION HUB FOR A GROUP-BASED COMMUNICATION SYSTEM," now U.S. Pat. No. 11,481,236. This application shares certain common subject matter with U.S. Non-Provisional patent application Ser. No. 17/064,344, filed Oct. 6, 2020, and entitled "AMBIENT, AD HOC, MULTIMEDIA COLLABORATION IN A GROUP-BASED COMMUNICATION SYSTEM," U.S. Non-Provisional patent application Ser. No. 17/064,161, filed Oct. 6, 2020, and entitled "SNIPPET(S) OF CONTENT ASSOCIATED WITH A COMMUNICATION PLATFORM," and U.S. Non-Provisional patent application Ser. No. 17/320,620, filed May 14, 2021, and entitled "ASYNCHRONOUS COLLABORATION IN A COMMUNICATION PLATFORM." The above-identified applications are herein incorporated by reference in their entirety.

TECHNICAL FIELD

Embodiments of the invention generally relate to multimedia communication, and more particularly, to a virtual multimedia collaboration content hub for a group-based communication system.

Traditionally, non-in-person collaboration has been divided into asynchronous communication (such as emails and group-based messaging), where a recipient may view a message minutes, days, or months after the sender sends it, and synchronous communication (such as phone calls and video meetings) which occur in real time but must be scheduled in advance. None of these formats can replicate the kind of serendipitous conversations that happen naturally in physical offices. Further, there is currently no way for users to view content relating to multimedia collaboration for both asynchronous communications and synchronous communications in one place.

SUMMARY

Embodiments of the invention solve the above-mentioned problems by providing computer-readable media, systems, and methods for generating a collaboration hub for display within a graphical user interface of a group-based communication system. The collaboration hub comprises information relating to recommended active users, recommended active synchronous multimedia collaboration sessions, and recommended asynchronous multimedia collaboration threads.

A first embodiment of the invention is directed to one or more computer-readable media storing computer-executable instructions that, when executed by a processor, perform a method of generating virtual content associated with a group-based communication system, the method comprising generating a collaboration hub for display in a graphical user interface of the group-based communication system, the collaboration hub comprising a list of recommended active users, a plurality of actuatable controls corresponding to respective users of the list of recommended active users, wherein the plurality of actuatable controls are configured to initiate at least one of a text-based communication session or a multimedia communication session with the respective user, a list of recommended active synchronous multimedia collaboration sessions, and a feed of recommended asynchronous multimedia collaboration sessions.

A second embodiment of the invention is directed to a method for generating virtual content associated with a group-based communication system, the method comprising generating a collaboration hub for display in a graphical user interface of the group-based communication system, the collaboration hub comprising a list of recommended active users, a plurality of actuatable controls corresponding to respective users of the list of recommended active users, wherein the plurality of actuatable controls are configured to initiate at least one of a text-based communication session or a multimedia communication session with the respective user, a list of recommended active synchronous multimedia collaboration sessions, and a feed of recommended asynchronous multimedia collaboration sessions.

A third embodiment of the invention is directed to a system for generating virtual content associated with a group-based communication system, the system comprising a data store storing information associated with the group-based communication system, a processor programmed to generate a collaboration hub for display in a graphical user interface of the group-based communication system, the collaboration hub comprising a list of recommended active users, a plurality of actuatable controls corresponding to respective users of the list of recommended active users, wherein the plurality of actuatable controls are configured to initiate at least one of a text-based communication session or a multimedia communication session with the respective user, a list of recommended active synchronous multimedia collaboration sessions, and a feed of recommended asynchronous multimedia collaboration sessions.

Additional embodiments of the invention are directed to generating a session preview for display within a graphical user interface of a group-based communication system. The session preview indicates information for the session including at least one of the number of users in the session, user activity within the session, and a set of actuatable controls relating to the session.

Further embodiments of the invention are directed to a method for initiating a synchronous multimedia collaboration session within a group-based communication system. The multimedia collaboration session is generated and additional users are invited to the multimedia collaboration session using a session invitation interface generated for display within a graphical user interface associated with the group-based communication system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1A:
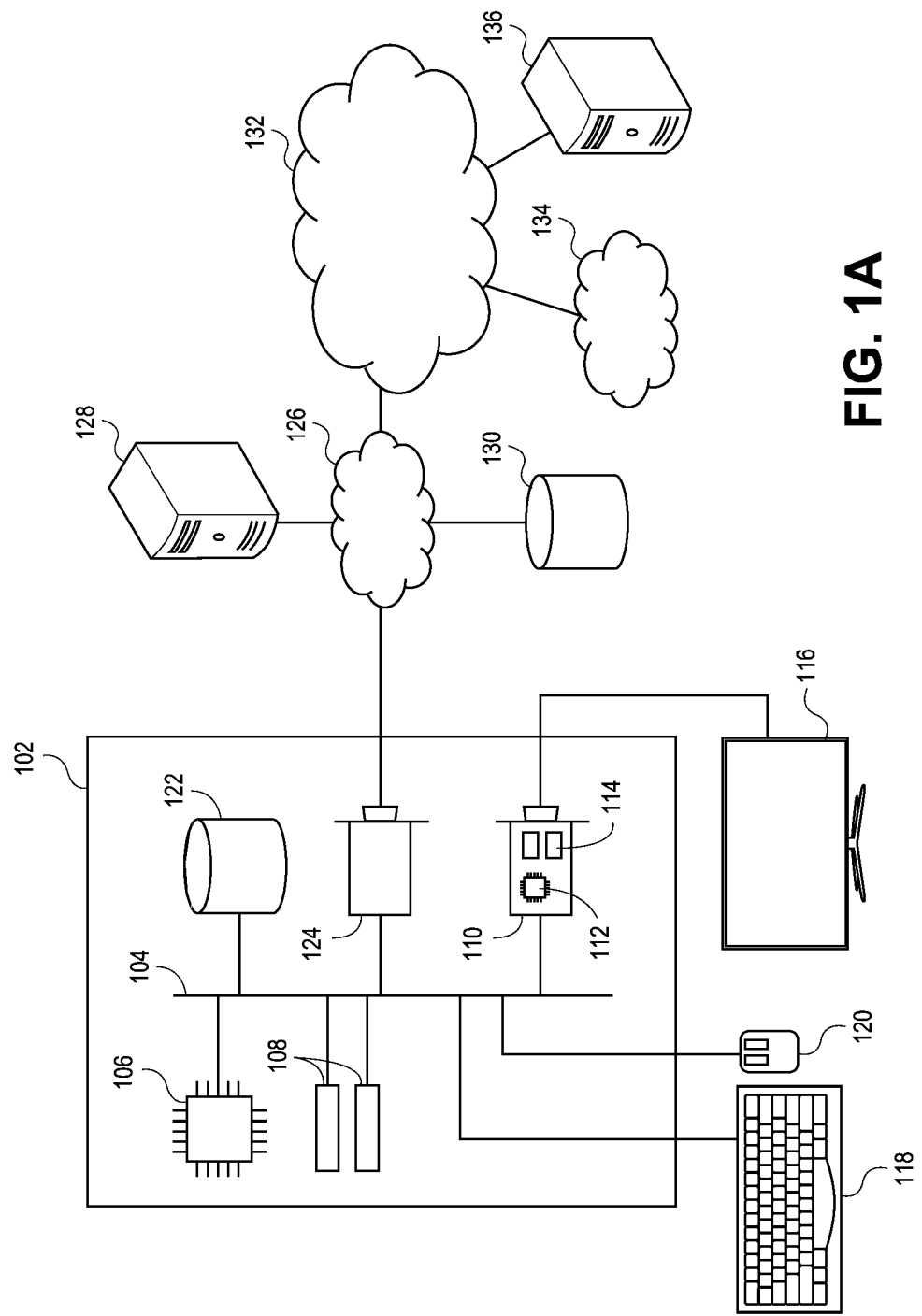
FIG. 1A depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

FIG. 1A illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media, and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, BLUETOOTH, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
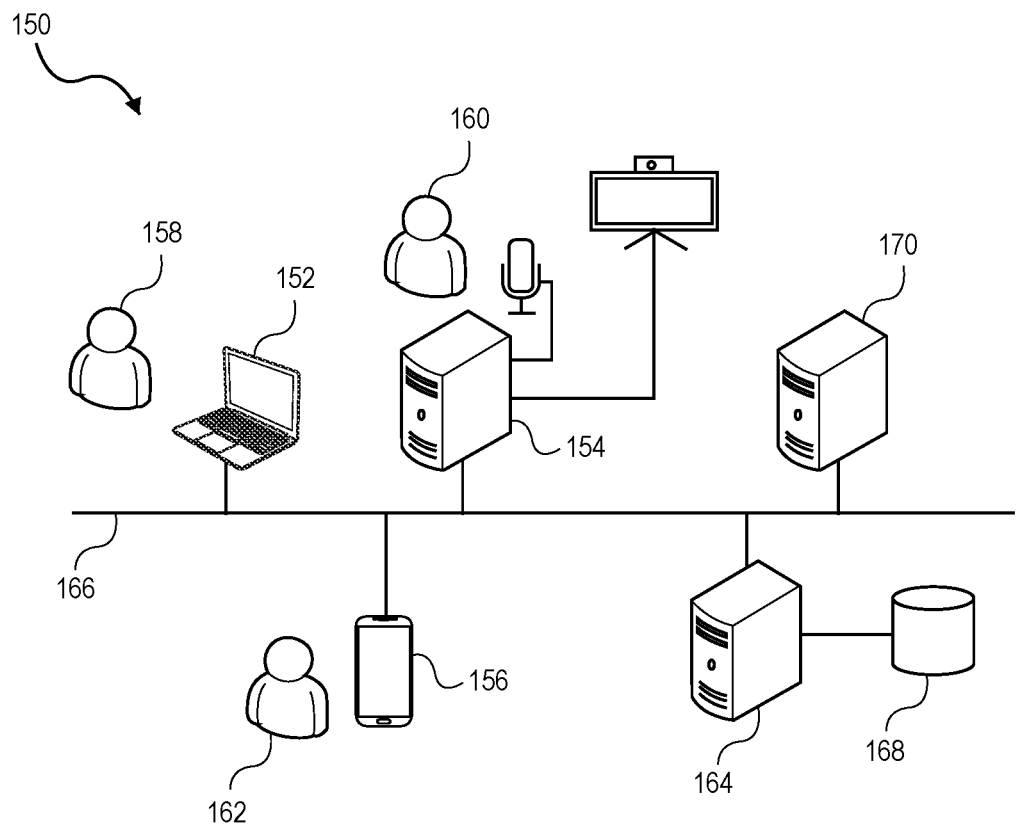
FIG. 1B depicts a system figure illustrating the elements of a system for carrying out embodiments of the invention.

FIG. 1B illustrates elements of a system 150 for carrying out embodiments of the invention. System 150 includes any number of client devices such as client device 152, client device 154, and client device 156 associated with user 158, user 160, and user 162 respectively. Although system 150 is depicted with one client device per user, an individual user may connect to the group-based communication system using multiple client devices, either concurrently or sequentially. Similarly, in some embodiments, multiple users may share (concurrently or sequentially) a single client device to access the group-based communication system. As depicted in FIG. 1B, client devices may be any form of computing device discussed above with respect to FIG. 1A. In particular, a user may access the group-based communication system using a desktop, a laptop, or a mobile device. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some embodiments, the group-based communication system is a channel-based messaging platform.

The group-based communication system is hosted by group-based communication system server 164. Group-based communication system server 164 may be a dedicated server, a shared server, a virtual machine instance in a cloud computing environment, or any other form of computing device discussed above with respect to FIG. 1A. Although a single group-based communication system server 164 is depicted, embodiments with multiple such group-based communication system servers are also contemplated so as to provide scale, redundancy and/or isolation between different instances of the group-based communication system. For example, a software development company may not wish to have its group-based communications system hosted on the same server as a competitor's group-based communication system for security reasons. Server 164 is communicatively coupled to client devices 152, 154, and 156 via network 166. Network 166 may be a local area network (LAN), wide-area network (WAN), virtual private network (VPN) or the Internet. Broadly speaking, any type of network for providing communication between the various components of system 150 is contemplated. Group-based communication system server 164 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client application are also contemplated.

Group-based communication system data store 168 is communicatively connected to group-based communication system server 164. As depicted, group-based communication system data store 168 is directly connected to group-based communication system server 164; however, any form of communicative connection (for example, network-attached storage (NAS), a network file system (NFS), or cloud-based storage) can be employed. Broadly speaking, group-based communication system data store 168 stores all of the durable information used by group-based communication system server 164. For example, group-based communication system data store 168 may store all of the messages with their associated channels, documents and images uploaded to particular channels, channel membership information, and/or user information. In some embodiments, collaboration sessions may be archived and stored on the group-based communication system data store 168 for subsequent retrieval. As previously discussed, multiple group-based communication system servers may be present in system 150. In such embodiments, each group-based communication system server may have its own copy of group-based communication system data store 168. Alternatively, multiple group-based communication system servers may share a single network-attached group-based communication system data store. Alternatively or in addition, in any of these embodiments, data may be sharded across multiple group-based communication system data stores.

Real-time media server 170 is also communicatively coupled to group-based communication system server 164 and client devices 152, 154 and 156. Real-time media server manages the multimedia aspects of real-time multimedia collaboration sessions among users of the group-based communication system as described in additional detail below. The term "multimedia" is used in this specification for brevity; however, it should be understood that the term used herein contemplates audio-only streams, video-only streams, audio/video streams, or any other combination of one or more media streams.

As depicted, the communication between real-time media server is via network 166. In some embodiments, however, the real-time nature of collaboration sessions may be better served by connecting via a different network for part or all of the communicative coupling. For example, a particular client device may normally connect to group-based communication system server 164 via a cellular data connection but switch to a WiFi connection when a multimedia collaboration session begins to accommodate an additional demand for bandwidth. In some embodiments, client devices may communicate multimedia collaboration data with each other via real-time media server 170 using a hub-and-spoke configuration. In other embodiments, client devices may communicate with each other directly using a peer-to-peer or supernode architecture. In still other embodiments, client devices on the same network may communicate with each other using multicast network protocols such as IP multicast. In yet other embodiments, media communication between the client devices may be via an edge-based scaling content distribution network.

Figure 2A:
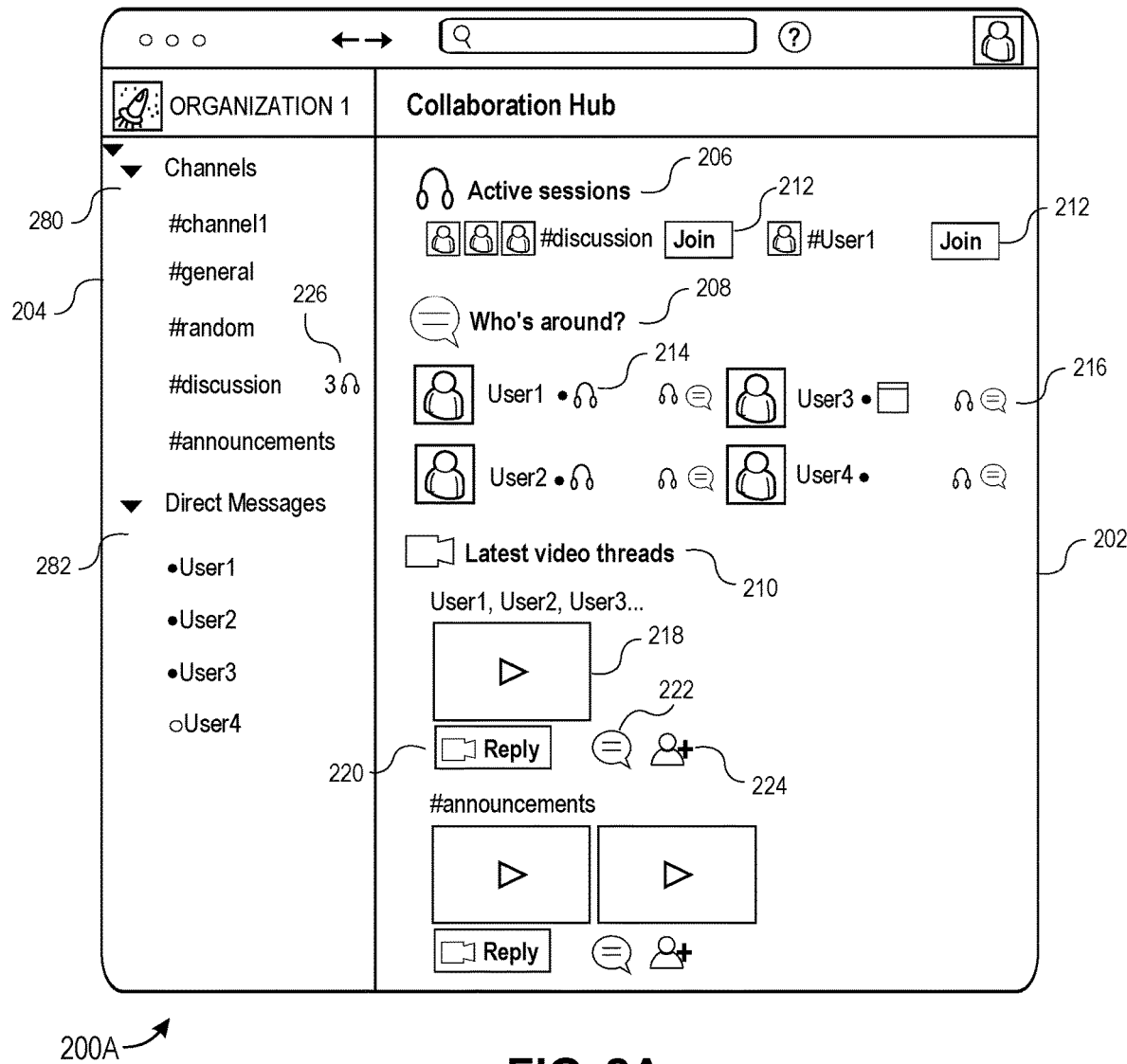
FIG. 2A depicts a user interface including a collaboration hub relating to some embodiments of the invention.

FIG. 2A illustrates an exemplary user interface 200A including a collaboration hub 202 and a sidebar pane 204. In some such embodiments, the user interface 200A may be a graphical user interface (GUI) associated with the group-based communication system. Further, the user interface 200A may be generated for display on one of client devices 152, 154, or 156 to an instant user operating one of said client devices. The collaboration hub 202 may comprise at least one of a list of recommended active synchronous multimedia collaboration sessions 206, a list of recommended active users 208, and a feed of asynchronous multimedia collaboration sessions or meetings comprising multimedia or video threads 210. The synchronous multimedia collaboration sessions, in some embodiments, include synchronous forms of multimedia communication such as video chat, audio chat, screen sharing, co-working, and other forms of synchronous communication between two or more users. Alternatively, the asynchronous multimedia collaboration sessions or meetings include asynchronous forms of communication such as posted videos and text-based message communications that are viewable asynchronously. Additional details associated with asynchronous forms of communication such as video messages are described in U.S. patent application Ser. No. 17/064,161, filed on Oct. 6, 2020, the entire contents of which are incorporated by reference herein. In some examples, video replies to an asynchronous collaboration session can be threaded together to create a video thread and/or feed as described in U.S. patent application Ser. No. 17/320,620, filed May 14, 2020, the entire contents of which are incorporated by reference herein.

The list of synchronous multimedia collaboration sessions 206 may include one or more active collaboration sessions selected for recommendation on the collaboration hub 202. For example, the collaboration sessions may be selected from a plurality of collaboration sessions displayed in the user interface 200A because they are currently active while the collaboration hub 202 is being viewed by the instant user. Further, the collaboration sessions may be selected based in part on user interaction with the sessions or some association of the instant user with the sessions. For example, the recommended collaboration sessions may be displayed in the collaboration hub 202 based in part on the instant user being a member of a respective collaboration session or invited to a respective collaboration session. Recommended collaboration sessions may be displayed based on the instant user's association with other users who are part of active collaboration sessions. In some examples, the collaboration hub 202 may display collaboration sessions based on a user's organization, attributes of the user's profile, topics and projects the user may be associated with, projects associated with the user, channels a user is associated with, and other factors.

The list of recommended active, synchronous multimedia collaboration sessions 206 may further comprise an actuatable join session button 212 for joining each respective session of the listed recommended sessions. In some embodiments, the join session button 212 may be an actuatable link to join the respective multimedia collaboration session. For example, the join session button 212 may be selected from within the user interface 200A, by clicking or tapping the button 212. Once the join session button 212 is actuated, the instant user may be added to the multimedia collaboration session associated with the join session button 212. In some embodiments, the list of recommended active multimedia collaboration sessions 206 further includes additional information for each respective session. For example, the list 206 may include at least one of an indication of the users in the session, an indication of the number of users in the session, and an indication of a group-based communication channel associated with the session, as shown. In some embodiments, the list of active sessions may include an actuatable control to create a new session, causing a newly created session to be added to the list of active sessions. Alternatively or in addition, where the collaboration session includes a video component (such as video of one or more users, screen sharing or co-working), a thumbnail depicting the video component may be depicted. In some embodiments, this thumbnail may be static. In other embodiments it may be fully dynamic or an animated series of thumbnails to reduce bandwidth consumption. Additionally, the name of the session, a topic for the session, the amount of time the session has been active, number of participants in the session, and other session related information may be included on the collaboration hub 202. In some embodiments, each multimedia collaboration session may be associated with a channel of the group-based communication system. In some embodiments, a synchronous multimedia collaboration session may be associated with users who are part of a group message or a direct message that is not associated with a channel. In some embodiments, a session preview 248 is depicted for some or all of the active sessions as shown in FIG. 2C. In some embodiments, the synchronous collaboration session comprises a session topic 238 indicating a topic for the session. The session topic 238 may be an arbitrary user defined topic or selected from a pre-populated list of topics (for example, a list of commonly used topics may be provided for user convenience). A user may add an arbitrary topic for the session by typing in a topic entry field. In some embodiments, the preview comprises a screen share preview which may include a notification indicating that a screen share is occurring and an indication of which user is screen sharing.

In some embodiments, a user may only join a single active, synchronous collaboration session at any one time. Therefore, joining a second active, synchronous collaboration will cause the user to leave the first active, synchronous collaboration session. In some embodiments, a user may be part of multiple active, synchronous collaboration sessions.

In some embodiments, the list of recommended active users 208 may include a plurality of group-based communication system users recommended based on at least one of user activity, user interaction, or other user information. For example, the list of recommended active users 208 may be selected from a plurality of users based on an active status of the users within the group-based communication system, historic, recent, or frequent user interaction such as users communicating within the group-based communication channel, or some similarity between users such as determining that a user shares common membership in channels with another user. The list of recommended active users 208 may include user information for each respective user. For example, the user's status information 214 may be depicted on the collaboration hub 202, as shown. The status information may include one or more of an indication that the user is active within the group-based communication system, an indication that the user is currently in a collaboration session, an indication that the user is in a scheduled meeting, an indication that the user is on vacation, an indication that the user is working remotely, or an indication that the user is home sick. In some embodiments, the status indication includes presence information, such as whether a user is active, idle, or offline. It should be understood that additional types of status information are contemplated for some embodiments.

In some embodiments, the list of recommended active users 208 further comprises a plurality of actuatable buttons 216 corresponding to respective listed active users. For example, the actuatable buttons 216, when selected, may be configured to initiate at least one of a text-based communication session or a multimedia communication session. In some embodiments, each listed active user may appear along with two respective actuatable buttons 216, as shown, a first button for initiating a synchronous multimedia collaboration session and a second button for initiating a text-based communication session. In some embodiments, a user may initiate an asynchronous meeting by clicking on the second button and starting an asynchronous video thread. In some embodiments, initiating the text-based communication session may include redirecting the user interface 200A of the group-based communication system to a direct (person-to-person) message channel shared with the listed recommended user associated with the respective actuatable button.

In some embodiments, one or more recommended asynchronous multimedia collaboration sessions or meetings are displayed in an asynchronous meeting section 210. In some embodiments, an asynchronous multimedia collaboration session is an asynchronous meeting where a topic is posted in a message at the beginning of a meeting thread and participants of the meeting may reply by posting a message or a video response. In some embodiments, the replies are aggregated in a video thread corresponding to the meeting. In some embodiments, a preview of a subset of video replies may be shown in the asynchronous collaboration session or thread. In some embodiments, each asynchronous collaboration session displayed in the collaboration hub is interactable, where a user may post a reply directly to an asynchronous collaboration session or view video replies to a particular asynchronous collaboration session. In some embodiments, clicking on a video thread causes the entire thread associated with the asynchronous meeting to be opened in a separate threads pane. In some embodiments, a user may interact with each posted message in the threads pane. In some embodiments, a preview for each of the asynchronous collaboration sessions may be generated for display on the collaboration hub 202 including one or more asynchronous playable videos 218, a reply button 220, a text-based communication button 222, and an add user button 224. The asynchronous playable videos 218 may be videos shared by other users within the thread of the asynchronous collaboration session. In some embodiments, selecting a preview for an asynchronous collaboration session may show the complete thread in greater detail or a partial view of the thread showing the latest posts in a new pane. In some embodiments, each collaboration session may be associated with a channel of the group-based communication system. For example, an asynchronous multimedia collaboration session may be hosted within an announcements channel of the group-based communication system, as shown. Accordingly, the channel name may be displayed along with the thread of the asynchronous collaboration session.

A reply button 220 may be included with each asynchronous collaboration session or a subset of asynchronous collaboration sessions, allowing users to record or otherwise post a multimedia or textual communication reply to an asynchronous collaboration session. For example, when a user actuates the reply button 220 by clicking on or tapping the button, a user may initiate recording a video reply which may be added to the thread associated with an asynchronous collaboration session. Additionally, a text-based communication button 222 may be included for each asynchronous collaboration session allowing users to create a text-message communication to be shared within the respective thread. In some embodiments, the add user button 224, may be displayed with an asynchronous meeting to allow users to be added to the asynchronous multimedia collaboration session. For example, a user may click on or tap the add user button 224, which causes an "add user" modal to be generated for display on the user interface 200A. The "add user" modal may include a plurality of users for selection to be added to the collaboration session, based on a user directory or a set of recommended users for the session. In some embodiments, any user who is associated with a channel, direct message, or group message with which an asynchronous collaboration session is associated with may post a reply. In some embodiments, adding a user to an asynchronous meeting mentions the added user specifically in the body of the meeting message. In some embodiments, mentioning a user will cause a notification or alert to be sent to the mentioned user that there is an asynchronous collaboration session. In some embodiments, adding a user enables the added user to reply to the asynchronous collaboration meeting, even if the user previously did not have permission to view.

The sidebar pane 204 comprises a channels section 280 which lists a plurality of channels of the group-based communication system and a direct message section 282 listing a plurality of direct messages with other users in the group-based communication system. In some embodiments, group messages between multiple users may also be listed in the direct messages section. In some embodiments, only channels to which the user has access (or only channels of which the user is a member) are included. The channels may include any combination of direct message channels, public channels, and private channels. Further, in some embodiments, if a channel is associated with an active synchronous multimedia collaboration session, a session indicator 226 may be included adjacent to the channel name indicating that a session is currently being hosted on the channel. Additionally, the session indicator 226 may show the number of users currently joined within the session, as shown.

Figure 2B:
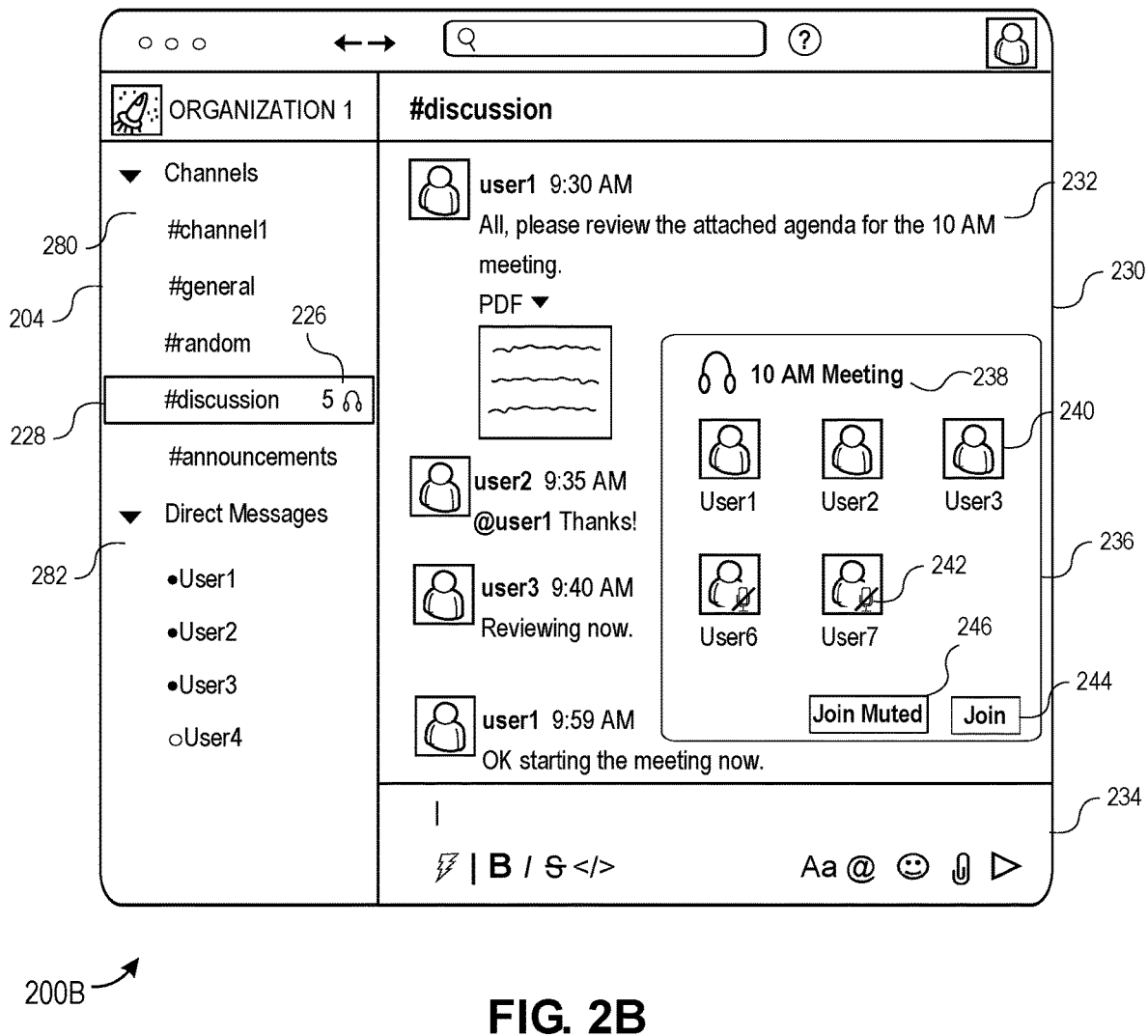
FIG. 2B depicts a user interface for a channel with an active multimedia collaboration session relating to some embodiments of the invention.
Figure 2C:
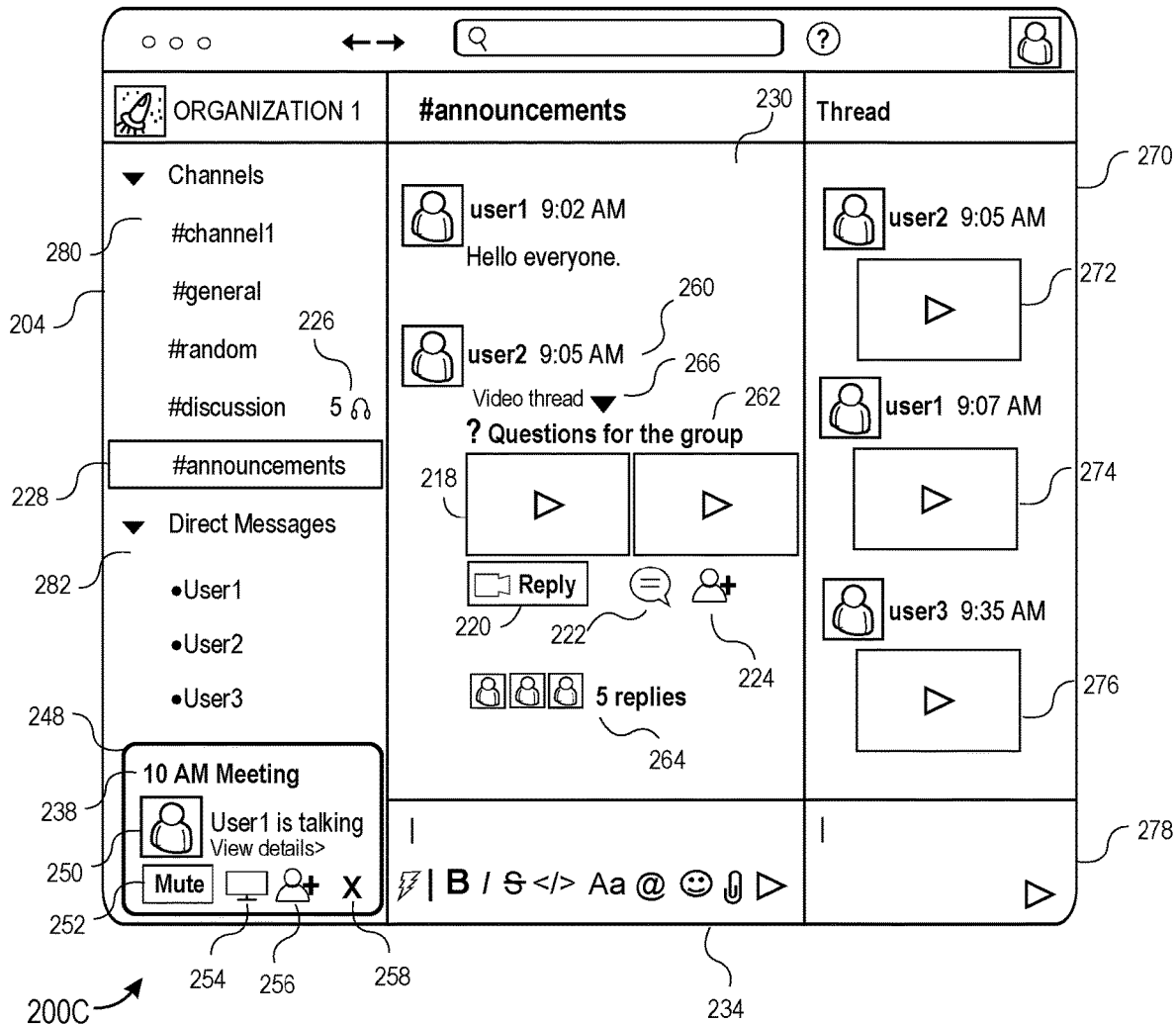
FIG. 2C depicts a user interface for an active multimedia collaboration session after the session has been joined relating to some embodiments of the invention.

FIG. 2B illustrates a user interface 200B for a channel 228 with an active, synchronous multimedia collaboration session prior to a user joining the session. The user interface 200B includes the sidebar pane 204 including a channel 228 with session indicator 226 showing the number of participants within the session. Additionally, the sidebar pane 204 may show a selected channel 228 with the channel name highlighted, outlined, displayed in a different color or font, or otherwise indicated in some way to indicate that the particular channel is currently selected and opened within the group-based communication system. In addition to the sidebar pane 204, the user interface 200B comprises a channel communication pane 230. The channel communication pane 230 includes a plurality of communications shared within the selected channel. For example, a plurality of messages 232 may be posted in the channel by channel members. The user interface 200B may further comprise a communication input field 234 for sharing messages, attachments, and other communications within the channel.

In some embodiments, if the selected channel includes a currently active, synchronous collaboration session, a session preview 236 may be generated for display on the user interface 200B. In some embodiments, the session preview 236 is generated when the synchronous collaboration session indicator 226 is clicked on from the sidebar pane 204. In some embodiments, the active session indicator may be displayed in the channel header, and clicking on the active session indicator causes the session preview 236 to be displayed. The session preview 236 may comprise an indication of the session topic 238, an indication of one or more users 240 within the session, an indication of the audio status 242 for each of the one or more users 240, a join button 244, and/or a join muted button 246. The audio status 242 may indicate whether the respective user is muted, unmuted, or talking within the multimedia collaboration session. In some embodiments, each indication 240 of a user within the session is a static image, such as a profile picture or a username. In other embodiments, each indication is a video thumbnail from a live video feed of the user. In still other embodiments, some users are indicated by a static image, while other users are indicated by a video thumbnail. Accordingly, the session preview 236 allows users to see if a multimedia collaboration session is currently ongoing in the channel, as well as which users are in the multimedia collaboration session and the audio status of each user in the session before joining the session. The join button 244 is an actuatable button that, when clicked or tapped, automatically joins the user to the multimedia collaboration session. Similarly, the join muted button 246 allows users to join sessions with their microphone muted. In some embodiments, it may be desirable to include the join muted button 246 such that users can join sessions quietly without disrupting the flow of the session. Further, users may wish to join a session just to listen to other users and not to actively communicate within the session.

In some embodiments, the session preview 236 may be displayed as a popover window covering a portion of the channel communication pane 230. Additionally, in some embodiments, the session preview 236 is movable such that the user can drag the session preview 236 to adjust the positioning within the user interface 200B. Further, in some embodiments, the session preview 236 automatically scales along with the overall size of the user interface 200B such that the session preview 236 never covers the communication input field 234. For example, if a user reduces the window size of the user interface 200B by clicking and dragging the edge of the window of the user interface 200B, the size of the session preview 236 will be automatically adjusted based on the window size change of the user interface 200B. In some such embodiments, it may be desirable to automatically adjust the size of the session preview 236 such that the communication input field 234 is always visible and the user can still input message communications while simultaneously viewing the session preview 236. Further still, in some embodiments, the user can adjust the size of the session preview 236 manually. In some embodiments, the session preview 248 is displayed at the bottom of the sidebar pane 204 on the user interface 200B, as illustrated in FIG. 2C. In some embodiments, the session preview pane may be freely moveable within the user interface by the user.

FIG. 2C illustrates a user interface 200C for an active synchronous multimedia collaboration session after the session has been joined by the user. Accordingly, the session preview 236 may be compressed into a compressed session preview 248. In some embodiments, session preview 248 may be depicted in the list of active sessions in the collaboration hub 202 depicted in FIG. 2A. In other embodiments, as discussed in additional detail below, session preview 248 appears in the sidebar pane 204 of the user interface 200C as the user navigates the group-based communication system. In such embodiments, the compressed session preview 248 comprises a subset of the information from the session preview 236 described above. For example, the compressed session preview 248 includes the session topic 238. In some embodiments, the compressed session preview 248 further comprises a current speaker indication 250 indicating the user that is currently speaking within the session (where the current speaker indication 250 is analogous to corresponding user identifier indication in 240), a mute button 252 operable to mute the microphone of the instant user within the session, a share screen button 254 operable to share the instant user's screen within the session, an add user button 256 for adding additional users to the session, and an exit button 258. In some embodiments, the exit button 258 is operable to close the compressed session preview 248. Alternatively, in some embodiments, the exit button 258 exits the session such that the instant user is removed from the session.

In some embodiments, a synchronous collaborative session includes additional affordances to add multimedia to the session such as video, audio, collaboration tools such as a whiteboard or a board, third party applications plugin, source code editor, document editor, web browser, spreadsheet, presentation software, game, photo or video editing software, command line terminal, or file browser and/or other co-working tools are also contemplated. For example, users in a synchronous multimedia collaboration session may use any of text, video, audio, file attachments, and other forms of media to communicate. In some embodiments, multiple forms of media may be synchronously streamed at the same time. For example, a user may speak in a video call while posting a text-based message or an image on a whiteboard associated with the session. In some embodiments, the whiteboard including text and image content is visible to each user of the synchronous multimedia collaboration session such that users can freely collaborate in real-time using various forms of media simultaneously.

In one example of the user interfaces 200B and 200C, a first user posts a message in a discussion channel on the group-based communication system including a meeting agenda for a scheduled meeting which will be carried out using a synchronous multimedia collaboration session. The first user initiates the multimedia collaboration within the discussion channel and sets a session topic for the initiated session "10 AM Meeting," which appears on the session preview 236. Additionally, the session preview 236 displays the users within the session and their microphone status.

For users within the discussion channel who have not yet joined the session, join button 244 and join muted button 246 may additionally appear on the session preview 236 allowing said users to join the session. For example, a fifth user is a member of the discussion channel and selects the join button 244 to join the session. In response to the fifth user joining the session, the session preview 236 may be compressed into the compressed session preview 248, as shown in FIG. 2C. Accordingly, the fifth user is able to view who is talking within the session, as well as other session related information. The fifth user may traverse the graphical user interface to view another channel while simultaneously viewing the compressed session preview in a sidebar of the graphical user interface, as shown in FIG. 2C. Accordingly, the fifth user may use the communication input field 234 to draft a text message to interact with users in an announcements channel while still joined to the session in the discussion channel.

Additionally, user interface 200C comprises the selected channel indication 228 and session indicator 226 indicating the active session. Further, the user interface 200C includes the channel communication pane 230. In some embodiments, users are able to navigate the group-based communication system while participating in a multimedia collaboration session. For example, as depicted, the instant user may view an "announcements" channel as the selected channel while participating in a session hosted on the "discussion" channel. It should be understood that the "discussion" and "announcements" channels are only examples of group-based communication channels and that any number of channels may be included with any variety of channel names for various applications of embodiments of the invention.

In some embodiments, as illustrated in FIG. 2C, an asynchronous multimedia collaboration session 260 may be hosted within a channel of the group-based communication system, as shown. In other embodiments, the asynchronous multimedia collaboration session 260 may be initiated from a direct message or a multi-person direct message of the group-based communication system. Here, the multimedia collaboration session may include one or more video and text message communications replies that are posted in the corresponding thread, as shown. Alternatively or in addition, a representation of this thread may be depicted in the "Collaboration Hub" of FIG. 2A. For example, a user may post a playable video within the channel to initiate or reply to the multimedia collaboration session. Additionally, the channel communication pane 230 may include a text reply to the playable video 218 and a video reply. In some embodiments, the text reply to the playable video 218 may be generated in response to a user clicking on the text-based communication button 222 adjacent to the original playable video 218 posted in the channel. Similarly, the video reply may be generated in response to a user clicking on the reply button 220. For example, the video reply may comprise video data recorded in response to a user clicking the reply button 220.

The asynchronous multimedia collaboration session thread 260 may appear in the channel communication pane 230, as shown. In some embodiments, the asynchronous multimedia collaboration session thread 260 comprises a session topic 262 including a user-selected description of the thread 260, which in some embodiments is a video thread, as shown. Additionally, the asynchronous multimedia collaboration session thread 260 comprises a reply indication 264 which indicates the number of replies in the thread, as shown. The replies may comprise either of video replies or text replies. In some embodiments, a thread expansion button 266 is included that, when selected by a user, expands the thread by displaying the replies within the thread in an expanded thread pane 270, as shown. Accordingly, the expanded thread pane 270 includes a first playable video 272, a second playable video 274, and a third playable video 276. In some embodiments, the first playable video 272 is the original playable video 218 of the thread and the second and third playable videos 274, 276 are subsequently posted video replies. It should be understood that additional forms of media content are contemplated to be posted in the thread such as, audio-only media, text media, and file attachments.

In some embodiments, a thread input field 278 is included below the expanded thread pane 270. The thread input field 278 allows the user to input replies to the thread 260 directly. In some embodiments, the thread input field 278 is similar to the communication input field 234 and allows the user to generate and edit a text message communication as well as add multimedia file attachments.

As demonstrated in the above described example, the collaboration hub 202, as shown in FIG. 2A, provides users with a unique experience by recommending relevant forms of collaboration based on user activity within the group-based communication system. Accordingly, users are able to quickly view and access synchronous multimedia collaboration sessions, asynchronous multimedia collaboration threads, and communications with individual users from a single interface. Further, the collaboration hub 202 includes previews and additional information informing users of various details within the group-based communication system, such as, what users are currently active, what the active users are doing, and the number of users in each actively occurring session. In some embodiments, the collaboration hub 202 may additionally notify users of the participants in each session. Additionally, embodiments of the invention provide users with the ability to freely multitask within the group-based communication system. For example, users can post messages or videos and comment on threads in one channel while actively attending a synchronous multimedia collaboration session in another channel. Accordingly, the productivity of the users in the group-based communication system is enhanced by offering such a variety of synchronous and asynchronous forms of communication and collaboration options.

Figure 3:
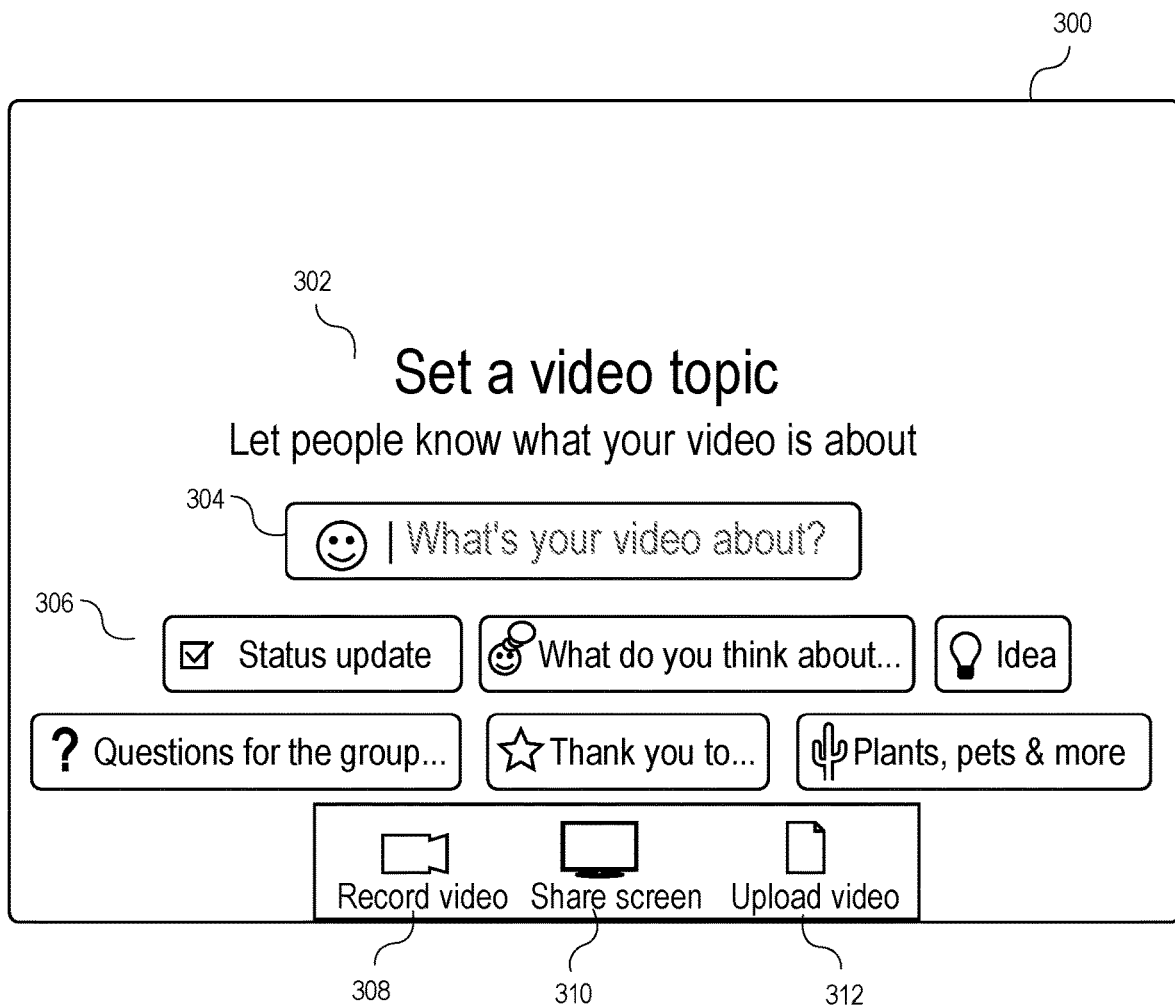
FIG. 3 depicts a user interface for an asynchronous multimedia collaboration session relating to some embodiments of the invention.

FIG. 3 illustrates an asynchronous session interface 300 for recording and generating a playable video for an asynchronous multimedia collaboration session within the group-based communication system. The asynchronous session interface 300 may be generated for display on a screen of one of client devices 152, 154, or 156. In some embodiments, the asynchronous session interface 300 may be displayed to a user after the user has actuated a control to post a video in an asynchronous multimedia collaboration session In some embodiments, the asynchronous session interface 300 is displayed in response to a user initiating an asynchronous multimedia collaboration session within the group-based communication system or after a user has selected the reply button 220.

In one example, the recording user has just finished recording the playable video which includes a video clip of the recording user speaking in reply to a previous video or other content posted in the asynchronous multimedia collaboration session. Accordingly, in some embodiments, a preview of the playable video may be generated for display in the background of the asynchronous session interface 300. Alternatively, in another example, the asynchronous session interface 300 may be displayed while the recording user is actively recording the playable video, such that a live stream of the video data is displayed on the asynchronous session interface 300.

The asynchronous session interface 300 comprises a topic notification 302 notifying the recording user to set a topic for the playable video, as shown. In some embodiments, the topic notification 302 is generated after the recording has finished. Additionally, a topic input field 304 may be included for the recording user to type or input a topic for the recorded video. In some embodiments, the topic input field 304 may comprise a text input field allowing the user to type a user defined topic for the recorded video. It should be understood that, in some embodiments, the topic input field 304 further allows image inputs or emojis to be added to the topic. Accordingly, embodiments are contemplated where a user-defined topic comprising both an emoji and a text description is generated using the topic input field 304.

In some embodiments, the asynchronous session interface 300 further includes a plurality of topic recommendations 306, as shown. The topic recommendations 306 include example topics which the recording user can select as the topic for the recorded video. In some embodiments, the topic recommendations 306 are generated based at least in part on previous video topics added by the user or other users within the group-based communication system. For example, in some embodiments, the plurality of topics 306 comprises topics which the recording user has used for previous playable videos. Alternatively or additionally, the plurality of topic recommendations 306 may comprise one or more default topics for the user to choose. In some embodiments, when the user selects one of the plurality of topic recommendations 306, the selected topic is automatically generated in the topic input field 304 for the user to accept the topic or further edit the topic using the topic input field 304, for example, by adding text or changing the topic emoji.

In some embodiments, the asynchronous session interface 300 further comprises a plurality of actuatable video controls including a record video button 308, a share screen button 310, and an upload video button 312. In some embodiments, the record video button 308, when actuated, may toggle to become stop recording button or a pause recording button (not shown). In some embodiments, the video controls 308, 310, and 312 are only included on the asynchronous session interface 300 while the recording user is recording a video, such that the video controls are not displayed or are changed after the video recording is finished. In such cases, the stop video button that replaces record video button 308 may be selected to stop recording of the video. In some embodiments, the stop video button additionally completes recording of the video. The share screen button 310, when selected by the user, switches the video recording from recording video data from the user's camera or webcam to recording video data from the screen of the user's device. In some embodiments, the screen share button 310 causes the entire screen of the user's device to be recorded. Alternatively, the user may be allowed to select a portion of the screen to be recorded including a portion relating to a specific application running on the user's device.

The upload video button 312, when selected, uploads a previously recorded video to the group-based communication system. In some embodiments, the upload video button 312 automatically posts a previously recorded video as a playable video in the asynchronous multimedia collaboration session. For example, the playable video 218 as shown in FIG. 2C. In some embodiments, additional video controls are included, for example, a pause video button may be included for temporarily pausing recording of the video such that the user can continue recording later on by pressing a record button. Additionally, in some embodiments, after the video has been recorded a play video button may be included on the asynchronous session interface 300 such that the recording user can review the recorded video before uploading.

In one example, the asynchronous session interface 300 is generated for display on a user device of a first user in response to the first user selecting the reply button 220 from a previously posted video in the asynchronous multimedia collaboration session. The first user may then operate the asynchronous session interface 300 to initiate recording of a video reply. Accordingly, the video control options are generated for display while the video is being recorded. Here, video and audio data are recorded from the first user's webcam and microphone respectively. The first user may then select the share screen button 310 to begin recording video data from the first user's screen. For example, the first user may screen share to discuss a specific document or content from another application during the video.

Figure 4:
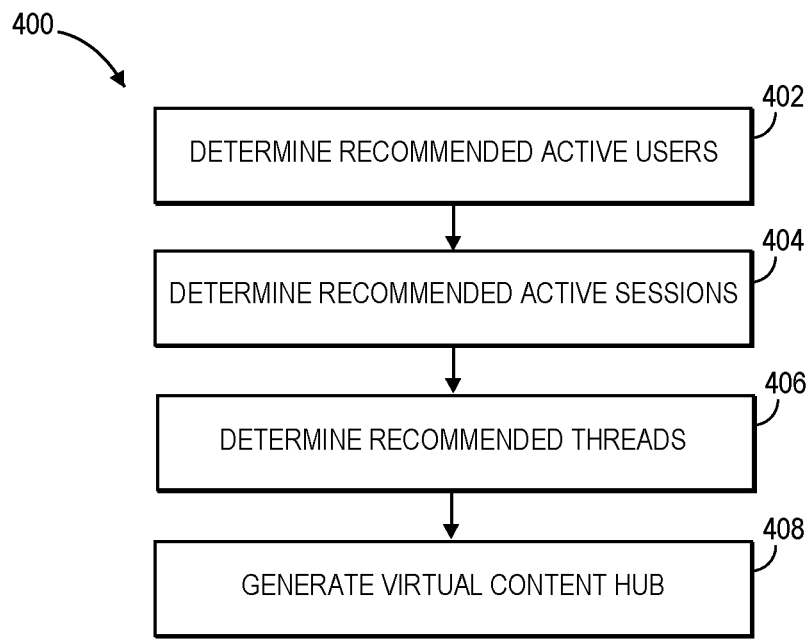
FIG. 4 depicts a method for generating a collaboration hub within a group-based communication system relating to some embodiments of the invention.

FIG. 4 illustrates a method 400 for generating the collaboration hub within the group-based communication system. In some embodiments, the collaboration hub may be generated on a user-specific basis such that each user of the group-based communication system receives a unique collaboration hub based at least in part on the user's preferences, activity, and associated information within the group-based communication system. For example, the content displayed on the collaboration hub of a first user may be different than the content displayed on the collaboration hub of a second user.

At step 402, a list of recommended active users is determined. In some embodiments, the list of recommended active users may be selected from a plurality of users based at least in part on user activity within the group-based communication system. In some embodiments, users may be recommended based on the frequency of interaction between users. For example, if a first user frequently communicates with a second user within the group-based communication system via any of direct messages, public channels, and private channels, the second user may appear on the list of recommended active users on the first user's collaboration hub. In some embodiments, this may further depend on the status of the second user (for example, whether the second user is currently active within the group-based communication system). Additionally, in some embodiments, users may be recommended based at least in part on associated information within the group-based communication system, such as whether two users have similar channel memberships within the group-based communication system. For example, if a first user and a second user are both members in a first channel and a second channel then the second user may be recommended on the first user's collaboration hub based on this association.

At step 404, a list of recommended active synchronous multimedia collaboration sessions is determined. In some embodiments, the recommended multimedia collaboration sessions may be selected from a plurality of multimedia collaboration sessions within the group-based communication system. Here, the multimedia collaboration sessions may be recommended based on multiple factors including, for example, whether the session is currently active, whether the user has previously been invited to the session or previously joined the session, if the session is hosted on a channel of which the user is a member, and other session-related information.

At step 406, a list of recommended asynchronous multimedia collaboration threads is determined. In some embodiments, the recommended multimedia collaboration threads are selected from a plurality of multimedia collaboration threads within the group-based communication system. In some such embodiments, the multimedia collaboration threads may be selected based on a plurality of factors including, for example, whether the user has been referenced within the thread, whether the user has previously posted a communication in the thread, when the most recent communication was posted within the thread, if the thread is hosted on a channel of which the user is a member, and other thread-related information. In some embodiments, it may be desirable to remove threads from consideration for being recommended after the threads have not been used for an extended duration of time. For example, if no new content has been posted to a thread for over a month, then the thread may be excluded from the collaboration hub. However, it should be understood that the time threshold for recommending the thread may be any suitable period of time, such as (for example) two months, three months, or a year.

At step 408, the collaboration hub 202 is generated for display in a graphical user interface of the group-based communication system. For example, the collaboration hub may be generated for display as a part of user interface 200A, as shown in FIG. 2A. It should be understood, however, that in some embodiments, the appearance of the collaboration hub may be altered and that the collaboration hub 202 may be user-specific with unique content being displayed for each user. Furthermore, the presence and arrangement of the various components of collaboration hub 202 may vary between embodiments and between users for the same embodiment. In some embodiments, collaboration hub 202 comprises each of the list of recommended active users 206, the list of recommended active synchronous multimedia collaboration sessions 208, and the feed of recommended asynchronous multimedia collaboration threads 210.

In some such embodiments, each of the lists 206, 208, and the feed 210 are displayed based on the significance of each item. For example, if it is determined that one of the recommended sessions is the most significant, then this session may be displayed at the top of the list of recommended active sessions 206. Here, the significance of the items may be determined based on the same criteria used to determine the recommended items. For example, if a user is recommended for the list of recommended active users, then the significance of the user will be determined on these same factors. In one example, a first user may appear at the top of the list of recommended active users because the instant user has most recently and frequently communicated with the first user. Similarly, a second user who is communicated with less frequently will appear further down on the list of recommended active users 208.

In some embodiments, the collaboration hub 202 further comprises actuatable controls 214 for each respective user on the list of recommended active users 208 that are configured to initiate at least one of a text-based communication session such as a direct message with the respective user or a multimedia communication session with the respective user. In some embodiments, the multimedia communication session may be carried out similarly to the synchronous multimedia collaboration session as described herein.

Figure 5:
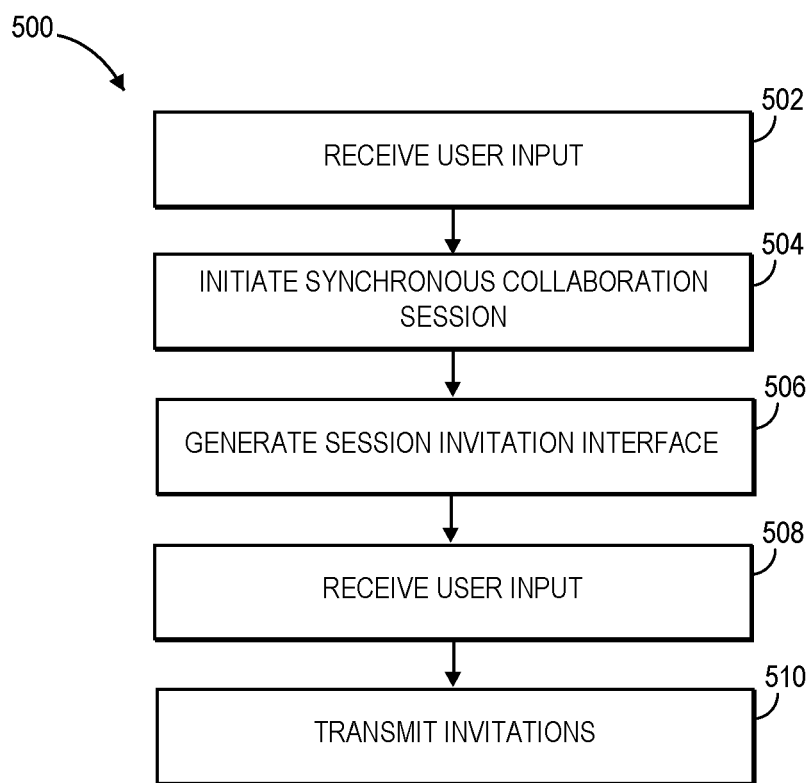
FIG. 5 depicts a method for initiating a synchronous multimedia collaboration session within a group-based communication system relating to some embodiments of the invention.

FIG. 5 illustrates a method 500 for initiating a synchronous multimedia collaboration session within the group-based communication system. At step 502, a user input is received to create a synchronous multimedia collaboration session. In some embodiments, the user input may be the user clicking a create session button or start session button (e.g., session join/initiate buttons 226, 212, and 214) within collaboration hub 202 in the graphical user interface of the group-based communication system. In some embodiments, the user input may additionally be received by the user selecting a shortcut for creating a session. In some embodiments, a session creation shortcut may be included in individual channels such that users are able to initiate sessions without visiting collaboration hub 202. Further, in some embodiments, the user input may be received from within a channel of the group-based communication system to associate a channel with the synchronous collaboration session. Alternatively, in some embodiments, the user may choose to associate a channel with the synchronous collaboration session once the session has been created. In some embodiments, a user may start a synchronous collaboration session with one or more users without being associated with any channel.

At step 504, the synchronous multimedia collaboration session is initiated within the group-based communication system. Here, initiation of the session may comprise any of generating a session identifier for the session or other session information. At step 506, session invitation user interface 400 is generated for display on the initiating user's user device. The session invitation user interface 400 comprises a graphical user interface suitable for selecting users to be invited to the initiated session. In some embodiments, the session invitation user interface 400 may recommend users to be invited based on user activity or other user associations as described herein.

At step 508, a user input is received by the session invitation user interface 400 to invite one or more users to the session. Accordingly, the initiating user may select one or more users from the session invitation user interface 400 to be invited to the session. At step 510, invitations are transmitted to the one or more selected users to invite the users to the session for synchronous multimedia collaboration. Accordingly, the users are able to interact and collaborate in real-time using various forms of media such as video and audio chat, live text communication, and screen sharing.

In some embodiments, the session provides a multimedia data stream to the users participating in the session. The multimedia data stream may comprise video data, audio data, or any combination thereof. For example, in some embodiments, users participating in the session may opt to share video data captured by a desktop webcam of the user's user device or a mobile phone camera, if the user is using a mobile phone to participate in the session. Additionally, users may choose not to share video data and communicate only through audio.

Figure 6:
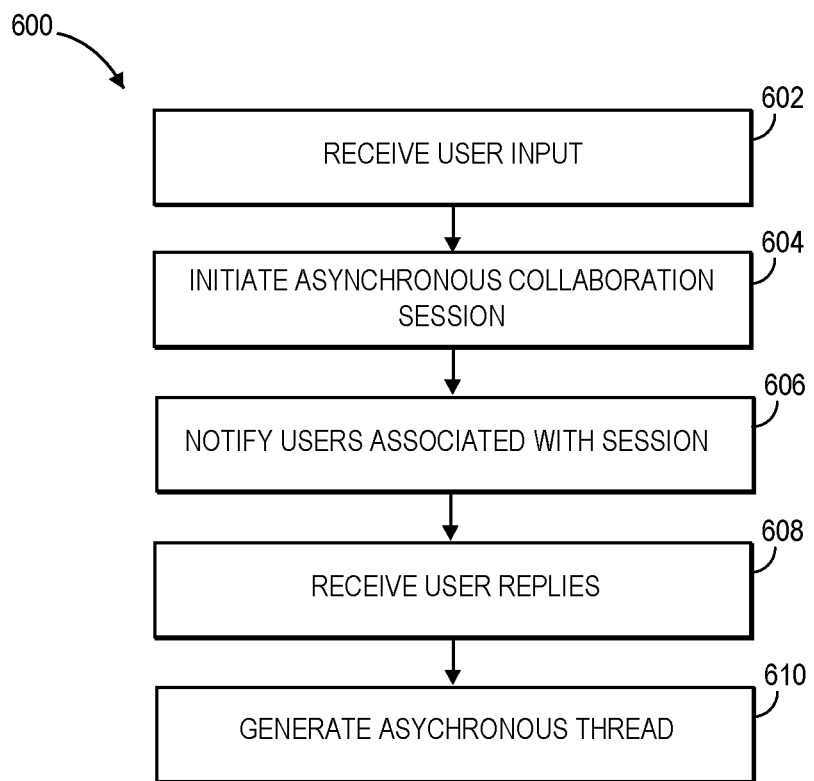
FIG. 6 depicts a method for an asynchronous multimedia collaboration session within a group-based communication system relating to some embodiments of the invention.

FIG. 6 illustrates a method 600 for facilitating an asynchronous multimedia collaboration session within the group-based communication system. At step 602, a user input is received. In some embodiments, the user input may be receiving multimedia content to be posted within the group-based communication system. For example, the user input may be a user posting a playable video within a channel of the group-based communication system. In some embodiments, in addition to the multimedia content an indication to start an asynchronous session is also received from the user. At step 604, an asynchronous multimedia collaboration session is initiated within the group-based communication system. In some embodiments, a session topic is received for the asynchronous session, for example, as described above with respect to FIG. 3.

At step 606, additional users are notified of the session. In some embodiments, only a select portion of users are notified. For example, embodiments are contemplated where only users who are associated with the asynchronous session are notified. In some embodiments, users may be referenced within the original post of the thread such that they are associated with the session and notified. Further, in some embodiments, users who are channel members where the original session communication was posted are notified. It should be understood that embodiments are contemplated where users who are not channel members may also be notified. For example, non-channel member users who are referenced within a post of the session thread may be notified and granted access to the session thread but not remaining content of the channel.

At step 608, replies are received from the additional users, or in some cases, the original user. The replies may be any of video replies, text replies, audio-only replies, file attachments, or other forms of multimedia content posted after the original session content. At step 610, an asynchronous thread 270 is generated for the asynchronous multimedia collaboration session comprising the originally posted communication and the replies. In some embodiments, the asynchronous thread 270 is generated for display as an expanded thread pane in a user interface such as shown in FIG. 2C. In some embodiments, only a preview portion of the thread is displayed in the channel, such as for example, the originally posted communication, and the thread is expanded based on a user actuating an expand button such as the thread expansion button 266, as shown in FIG. 2C.

In some embodiments, asynchronous multimedia collaboration sessions may be desirable when asynchronous communication is required. For example, in some cases users may have scheduling conflicts such that synchronous real-time meetings are not possible. Accordingly, asynchronous multimedia collaboration sessions may be used to provide multimedia communication between users where users are able to interact on their own time without requiring other users to be constantly present.

Although the invention has been described with reference to the embodiments illustrated in the attached drawing figures, it is noted that equivalents may be employed and substitutions made herein without departing from the scope of the invention as recited in the claims.

The invention claimed is:

1. One or more non-transitory computer-readable media storing computer-executable instructions that, when executed by at least one processor, perform a method of connecting a user with one or more users in a group-based communication system, the method comprising:
   causing display of a user interface;
   identifying one or more recommended active synchronous multimedia collaboration sessions within the group-based communication system based at least in part on determining that the user is a member of one or more channels associated with the one or more recommended active synchronous multimedia collaboration sessions;
   causing display of information indicative of the one or more recommended active synchronous multimedia collaboration sessions in the user interface;
   causing display of one or more controls in the user interface corresponding to a respective recommended active synchronous multimedia collaboration session of the one or more recommended active synchronous multimedia collaboration sessions which allows the user to join the respective recommended active synchronous multimedia collaboration session;
   receiving, from the user, a selection of a control from the one or more controls; and
   responsive to receiving the selection of the control from the one or more controls, joining the user to the respective recommended active synchronous multimedia collaboration session.

2. The one or more non-transitory computer-readable media of claim 1, wherein the method further comprises:
   receiving, from the user, a second selection of a second control from the one or more controls; and
   responsive to receiving the selection of the second control from the one or more controls, joining the user to the respective recommended active synchronous multimedia collaboration session corresponding to the second selected control.

3. The one or more non-transitory computer-readable media of claim 1, wherein the one or more recommended active synchronous multimedia collaboration sessions are further identified based at least in part on previous interaction between the user and the one or more recommended active synchronous multimedia collaboration sessions.

4. The one or more non-transitory computer-readable media of claim 1, wherein the one or more recommended active synchronous multimedia collaboration sessions are further identified based at least in part on previous interaction between the user and an additional user currently joined to the one or more recommended active synchronous multimedia collaboration sessions.

5. The one or more non-transitory computer-readable media of claim 1, wherein the method further comprises:
   causing display of additional information associated with the one or more recommended active synchronous multimedia collaboration sessions, the additional information comprising:
      a first indication of one or more active users currently joined to the respective recommended active synchronous multimedia collaboration session of the one or more recommended active synchronous multimedia collaboration sessions; and
      a second indication of a group-based communication channel of the one or more channels associated with the respective recommended active synchronous multimedia collaboration session of the one or more recommended active synchronous multimedia collaboration sessions.

6. The one or more non-transitory computer-readable media of claim 5, wherein the additional information further comprises:
   a third indication of a number of users currently joined to the respective recommended active synchronous multimedia collaboration session of the one or more recommended active synchronous multimedia collaboration sessions.

7. The one or more non-transitory computer-readable media of claim 1, wherein the method further comprises:
   causing display of a session preview associated with a respective one of the one or more recommended active synchronous multimedia collaboration sessions, the session preview comprising an indication of a session topic associated with the respective one of the one or more recommended active synchronous multimedia collaboration sessions and a current speaker indication.

8. A method of connecting a user with one or more users in a group-based communication system, the method comprising:
   causing display of a user interface;
   identifying one or more recommended active synchronous multimedia collaboration sessions within the group-based communication system based at least in part on determining that the user is a member of one or more channels associated with the one or more recommended active synchronous multimedia collaboration sessions;
   causing display of information indicative of the one or more recommended active synchronous multimedia collaboration sessions in the user interface;
   causing display of one or more controls in the user interface, corresponding to a respective recommended active synchronous multimedia collaboration session of the one or more recommended active synchronous multimedia collaboration sessions, which allows the user to join the respective recommended active synchronous multimedia collaboration session;
   receiving, from the user, a selection of a control from the one or more controls; and
   responsive to receiving the selection of the control from the one or more controls, joining the user to the respective recommended active synchronous multimedia collaboration session.

9. The method of claim 8, further comprising:
   receiving, from the user, a second selection of a second control from the one or more controls; and
   responsive to receiving the selection of the second control from the one or more controls, joining the user to the respective recommended active synchronous multimedia collaboration session corresponding to the second selected control.

10. The method of claim 8, wherein the one or more recommended active synchronous multimedia collaboration sessions are further identified based at least in part on previous interaction between the user and the one or more recommended active synchronous multimedia collaboration sessions.

11. The method of claim 8, wherein the one or more recommended active synchronous multimedia collaboration sessions are further identified based at least in part on previous interaction between the user and an additional user currently joined to the one or more recommended active synchronous multimedia collaboration sessions.

12. The method of claim 8, further comprising:
causing display of additional information associated with the one or more recommended active synchronous multimedia collaboration sessions, the additional information comprising:
  a first indication of one or more active users currently joined to the respective recommended active synchronous multimedia collaboration session of the one or more recommended active synchronous multimedia collaboration sessions; and
  a second indication of a group-based communication channel of the one or more channels associated with the respective recommended active synchronous multimedia collaboration session of the one or more recommended active synchronous multimedia collaboration sessions.

13. The method of claim 12, wherein the additional information further comprises:
A third indication of a number of users currently joined to the respective recommended active synchronous multimedia collaboration session of the one or more recommended active synchronous multimedia collaboration sessions.

14. The method of claim 8, further comprising:
causing display of a session preview associated with a respective one of the one or more recommended active synchronous multimedia collaboration sessions, the session preview comprising an indication of a session topic associated with the respective one of the one or more recommended active synchronous multimedia collaboration sessions and a current speaker indication.

15. A system comprising:
at least one processor; and
one or more non-transitory computer-readable media storing computer-executable instructions that, when executed by the at least one processor, perform a method of connecting a user with one or more users in a group-based communication system, the method comprising:
  causing display of a user interface;
  identifying one or more recommended active synchronous multimedia collaboration sessions within the group-based communication system based at least in part on determining that the user is a member of one or more channels associated with the one or more recommended active synchronous multimedia collaboration sessions;
  causing display of information indicative of the one or more recommended active synchronous multimedia collaboration sessions in the user interface; causing display of one or more controls in the user interface corresponding to a respective recommended active synchronous multimedia collaboration session of the one or more recommended active synchronous multimedia collaboration sessions which allows the user to join the respective recommended active synchronous multimedia collaboration session;
  receiving, from the user, a selection of a control from the one or more controls; and
  responsive to receiving the selection of the control from the one or more controls, joining the user to the respective recommended active synchronous multimedia collaboration session.

16. The system of claim 15, wherein the method further comprises:
receiving, from the user, a second selection of a second control from the one or more controls; and
responsive to receiving the selection of the second control from the one or more controls, joining the user to the respective recommended active synchronous multimedia collaboration session corresponding to the second selected control.

17. The system of claim 15, wherein the one or more recommended active synchronous multimedia collaboration sessions are further identified based at least in part on previous interaction between the user and the one or more recommended active synchronous multimedia collaboration sessions.

18. The system of claim 15, wherein the one or more recommended active synchronous multimedia collaboration sessions are further identified based at least in part on previous interaction between the user and an additional user currently joined to the one or more recommended active synchronous multimedia collaboration sessions.

19. The system of claim 15, wherein the method further comprises:
causing display of additional information associated with the one or more recommended active synchronous multimedia collaboration sessions, the additional information comprising:
  a first indication of one or more active users currently joined to the respective recommended active synchronous multimedia collaboration session of the one or more recommended active synchronous multimedia collaboration sessions; and
  a second indication of a group-based communication channel of the one or more channels associated with the respective recommended active synchronous multimedia collaboration session of the one or more recommended active synchronous multimedia collaboration sessions.

20. The system of claim 19, wherein the additional information further comprises:
a third indication of a number of users currently joined to the respective recommended active synchronous multimedia collaboration session of the one or more recommended active synchronous multimedia collaboration sessions.

\* \* \* \* \*